(12) United States Patent
Auld et al.

(10) Patent No.: US 11,976,904 B1
(45) Date of Patent: May 7, 2024

(54) BULLET DETECTING TARGETS WITH INTEGRAL CALIBRATION

(71) Applicant: AUTOMATED TARGET SOLUTIONS, INC., Ivyland, PA (US)

(72) Inventors: Brian William Auld, Ivyland, PA (US); Harvey Albert Shuhart, III, Doylestown, PA (US)

(73) Assignee: AUTOMATED TARGET SOLUTIONS, INC., Ivyland, PA (US)

( * ) Notice: Subject to any disclaimer, the term of this patent is extended or adjusted under 35 U.S.C. 154(b) by 353 days.

(21) Appl. No.: 17/394,233

(22) Filed: Aug. 4, 2021

Related U.S. Application Data

(60) Provisional application No. 63/061,275, filed on Aug. 5, 2020.

(51) Int. Cl.
| | | |
|---|---|---|
| *F41J 5/044* | (2006.01) | |
| *F41J 5/04* | (2006.01) | |
| *G01V 3/02* | (2006.01) | |
| *G01V 13/00* | (2006.01) | |

(52) U.S. Cl.
CPC .............. *F41J 5/042* (2013.01); *G01V 3/02* (2013.01); *G01V 13/00* (2013.01)

(58) Field of Classification Search
None
See application file for complete search history.

(56) References Cited

U.S. PATENT DOCUMENTS

| | | |
|---|---|---|
| 2,506,475 A | 5/1950 | Ellis |
| 2,819,084 A | 1/1958 | Brown |
| 3,004,763 A | 10/1961 | Knapp |
| 3,047,546 A | 7/1962 | Lober |
| 3,112,110 A | 11/1963 | Schulman |
| 3,215,933 A | 11/1965 | Scanlon, Jr. |
| 3,401,939 A | 9/1968 | La Mura |
| 3,447,077 A | 5/1969 | Loxley |
| 3,529,828 A | 9/1970 | Thalmann |
| 3,580,579 A | 5/1971 | Scharz |

(Continued)

FOREIGN PATENT DOCUMENTS

| | | |
|---|---|---|
| FR | 2765318 | 12/1998 |
| WO | 9504912 A1 | 2/1995 |

OTHER PUBLICATIONS

English machine translation of Fayolle (FR 2765318 A1) (Year: 1998).

*Primary Examiner* — Sunit Pandya
(74) *Attorney, Agent, or Firm* — O'BANION & RITCHEY LLP; John P. O'Banion

(57) ABSTRACT

A bullet hit detecting target panel which is configured with at least one calibration trace having a resistance that is set, and/or adjusted, to meet the characteristics of the target panel, such as panel type, zone arrangement and resistance characteristics of the conductive layers. When the target is physically and electrically connected to a target controller, then a calibration procedure is entered by applying a conductor to one or more resistive calibration structures on the target panel. Electrical characteristics of the resistive calibration structures are measured, and used for setting a hit threshold for target zones on the target panel. After which the conductor may be removed and the target is ready to accurately register hits based on the established hit threshold.

18 Claims, 7 Drawing Sheets

(56) References Cited

U.S. PATENT DOCUMENTS

| | | | |
|---|---|---|---|
| 3,854,722 A | 12/1974 | Ohlund | |
| 3,875,481 A | 4/1975 | Miller | |
| 4,240,640 A | 12/1980 | LaMura | |
| 4,244,583 A | 1/1981 | Wood | |
| 4,437,671 A * | 3/1984 | Busch | F41J 5/04 |
| | | | 434/19 |
| 4,786,058 A | 11/1988 | Baughman | |
| 4,828,269 A | 5/1989 | Tessel | |
| 4,953,875 A | 9/1990 | Sudit | |
| 5,516,113 A * | 5/1996 | Hodge | F41J 5/041 |
| | | | 178/18.05 |
| 5,577,733 A | 11/1996 | Downing | |
| 6,994,347 B2 | 2/2006 | Tessel | |
| 8,047,546 B1 | 11/2011 | Klein | |
| 10,731,954 B2 | 8/2020 | Auld | |
| 2003/0168812 A1 | 9/2003 | Tessel | |
| 2005/0017456 A1* | 1/2005 | Shechter | F41J 5/14 |
| | | | 273/371 |
| 2014/0091816 A1* | 4/2014 | Hodge | F41J 5/048 |
| | | | 324/679 |
| 2015/0369572 A1 | 12/2015 | Smolka | |
| 2016/0076859 A1* | 3/2016 | Chester | F41J 5/056 |
| | | | 273/386 |
| 2016/0209185 A1 | 7/2016 | Ford | |
| 2016/0327377 A1 | 11/2016 | Flynn | |
| 2016/0334195 A1* | 11/2016 | Auld | F41J 7/06 |

\* cited by examiner

BULLET DETECTING TARGETS WITH INTEGRAL CALIBRATION

CROSS-REFERENCE TO RELATED APPLICATIONS

This application claims priority to, and the benefit of, U.S. provisional patent application Ser. No. 63/061,275 filed on Aug. 5, 2020, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to hit sensing ballistic targets, and more particularly to a ballistic target having a calibration mode.

2. Background Discussion

Numerous conductive-type hit sensing targets have relied upon using aluminum foil in the sensing regions as it is thin, inexpensive and provides high conductivity. However, using aluminum foil for both the front and back layers causes issues with occasional "short circuiting" when shards of foil from the front layer are partially rearwardly displaced (pushed) through the hole made by the bullet into the back layer causing a continuous electrical short between the layers, which then prevents proper sensing in that conductive region.

However, replacing the metallic foils with more frangible (non-foil) conductive coatings creates numerous problems because of its significantly lower conductivity.

Accordingly, a need exists for enhanced ways of utilizing non-foil materials as conductive coatings in hit sensing targets.

BRIEF SUMMARY

A hit-sensing calibration-enabled target panel is described which can be calibrated by the user to optimize hit sensing thresholds, especially when using non-foil materials as conductive coatings in layers of the target. In addition, the disclosure describes a target controller which is configured for utilizing these hit sensing targets.

The target panel contains at least two electrically conductive layers which are electrically insulated from one another. These layers contain one or more regions, such as comprising target zones. A bullet striking a target zone passes through these conductive regions creating a brief closed circuit connection as registered on a target controller. However, in some cases the thresholds for hit sensing can produce inaccurate results as the resistance of the conductive coatings in layers of the target can differ.

The described target panels include at least one conductive calibration trace having a set, and/or adjustable, resistance based on conductive characteristics of that target panel. A calibration process is entered by applying a conductor to one or more resistive calibration structures on the target panel allowing the resistance of the calibration structures to be registered on the target controller. Calibration mode signal response is determined for the resistive calibration structures and used to set a hit threshold for target zones on the target panel. Once the conductor is removed from the target panel then accurate bullet hit detection can be performed since the thresholds have been adjusted based on the characteristics of that particular target panel.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Conductive Hit Sensing Target Panel

Figure 1A:
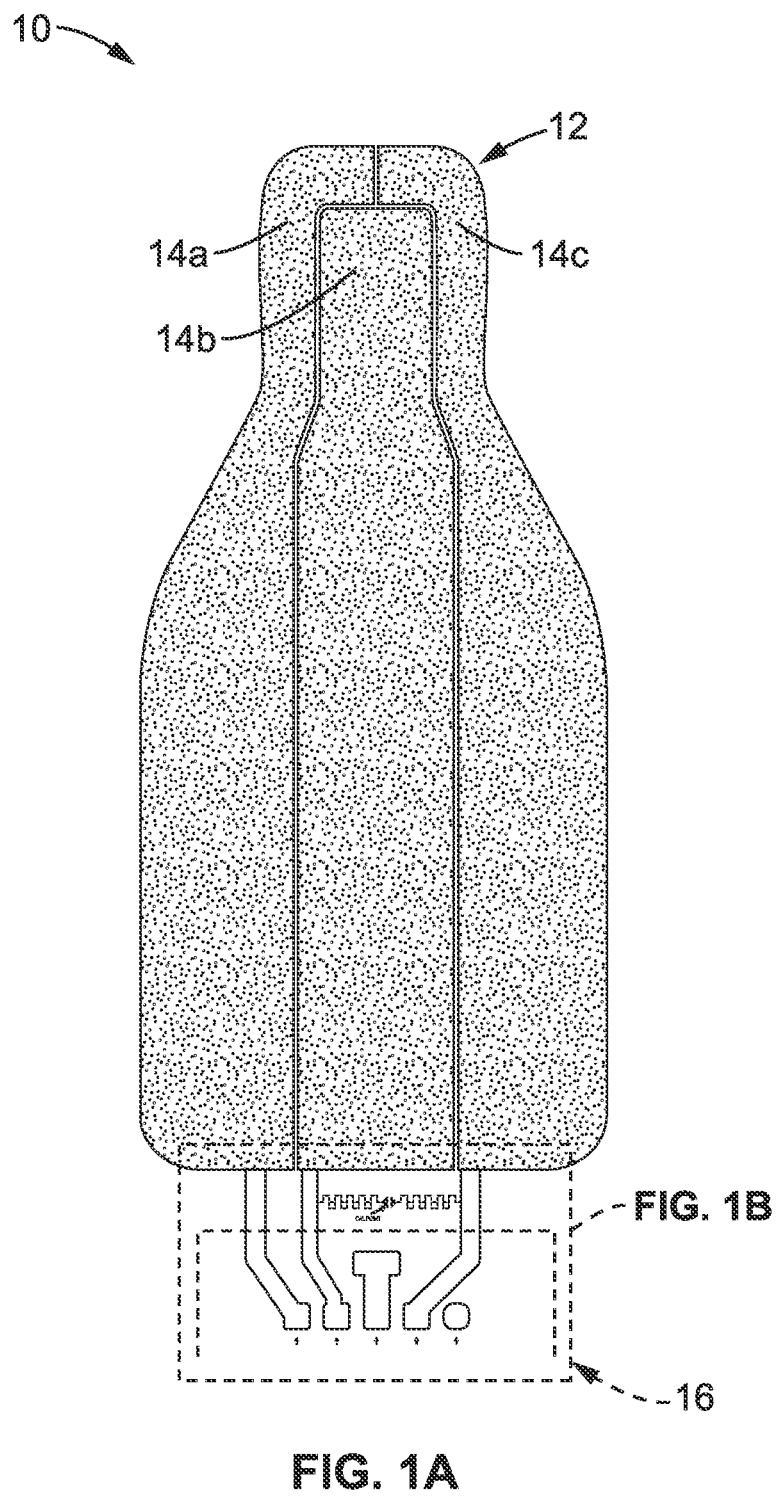
FIG. 1A and FIG. 1B are front views of a calibration-enabled hit-sensing target panel and a magnified connection pad area thereof, according to at least one embodiment of the present disclosure.

Hit sensing targets provide a means for optimizing firearms training for military, police and civilian populations. Generally a hit sensing target requires at least two embedded conductive layers which are separated from one another by a light-weight non-conductive filler material (e.g., foam, cardboard, and so forth). As a bullet passes through the target, the conductive layers at that location make brief electrical contact with one another, either directly, or indirectly by conducting from one layer and through the exterior of the bullet to the other layer.

1.1. Targets Using Conductive Coatings

Replacing metallic foil sensing regions of a target with conductive coatings that are sprayed, silkscreened or otherwise applied to one or more layers of the target, can overcome short circuit problems during use, but other issues have arisen making the approach less than desirable.

In at least one embodiment of a two conductive layer target, it is the front layer (e.g., the layer which the bullet would strike first) which is preferably changed from a metallic foil material to a layer applied as a non-foil conductive coating material (e.g., conductive ink or paint); since material from the rear layer is not likely to be drawn forward toward the first layer to cause a short.

The use of a conductive coating can prevent the short-circuiting issue, yet it can create other challenges. One such challenge is that conductive coatings, generally applied as a mixture of conductive particles in a liquid carrier (e.g., ink or paint), are not nearly as conductive as a metallic foil, and there is a direct correlation between cost and conductivity in such mixtures.

Since targets are consumable in nature, there is a need to use inexpensive materials for their production. Carbon-based coatings are among the cheapest conductive coatings, but also one of the least conductive. When carbon is used for targets, it results in a target that generates a stronger signal when sensing hits at the bottom of the target and the weakest signals when it receives a hit towards the top of the target which is farthest away from the sensing electrodes (presuming that the target is coupled to the target system at the bottom of the target).

It will be noted that where the hit sensing signal needs to travel through the longest length of carbon trace the resistance is higher. This property, combined with the fact that multiple target shapes and sizes may be produced, can lead to issues with hit thresholding when switching from one style of target to another. In addition, the somewhat loose tolerances of silk screening (e.g., trace depth and trace width) can lead to production of two targets of the same style which differ sufficiently in their conductivity characteristics so as to create erroneous hit-sensing.

For ease of understanding, consider a conventional two-layer panel where a signal injected into a first conductive layer of the target is registered on a second conductive layer of the target in response to a momentary connection (hit) being created between the first and second layer. It should be appreciated that the recitation of first and second layers, is only for the purpose of convenience of description, as the present disclosure can be configured with more than two conductive trace layers, with hit sensing determined between any combination of layers whose conductivity between layers changes in response to a bullet passing through the target.

It should also be noted that hit sensing based on the state of the conduction path between the layers can be sensed in a number of alternative ways without departing from the teachings of the present disclosure. For example the signal can comprise voltage sensing, current sensing, resistance sensing, or combinations thereof. In addition, these can be generally performed using direct current (DC) or alternating current (AC) signals.

When the signal level on the second layer exceeds a threshold, the over-threshold condition is assumed to be a bullet hit, and the hit is registered. If the signal threshold is set too low, then "false hits" may be registered from conditions, such as rain or electrical interference. If the signal threshold is set too high, however, bullet hits may be missed, especially when bullets strike the target in areas which are farthest away from where the electrical connections are made to the target. The improved target panel described herein minimizes such errors.

In response to this need, the present disclosure describes an improved conductive-type hit sensing target panel that can be calibrated by the user.

2. Advantages of the Hit-Sensing Calibration-Enabled Targets

One of the advantages of the calibration-enabled targets and a respective system incorporating suitable calibration circuitry, is that this approach allows for looser tolerances on the process utilized for applying the coating (e.g., silk screening). If more of the coating is applied to the entire target, the calibration point changes relative to the rest of the target.

The calibration-enabled targets provide a simple mechanism by which the signal thresholds for a given type, batch, and/or specific target can be established toward eliminating false hits and preventing missing hits which result from disparate levels of conductivity in the traces and zones of the target.

Since the desired signal thresholds should ideally allow for a margin of error, the trace connected to the calibration point should have a higher resistance than the rest of the target. However it should not be too high, because that would result in a target that may be prone to false hits, especially in situations where rain or moisture might be present. To allow for more precise calibration, multiple parallel current paths can be provided, some of which may be cut or otherwise removed during the manufacturing process, as a way to fine tune the final resistance value of one or more calibration traces for the given target before it reaches the user.

3. Target System for Hit-Sensing Calibration-Enabled Targets

It should be appreciated that the described hit-sensing calibration-enabled targets can be utilized in a number of different types of target training systems, which are adapted for their use. Largely these fall into two different classes: (1) target systems which retain each target in a fixed position, and (2) target systems which provide positioning of the target (e.g., pop-up, turning, linear motion, random motion, or combination thereof). By way of example and not limitation the present disclosure is described for use in a target system which can provide target motion of one form or another, by coupling the target to a target positioning unit controller as will be described in a later section.

4. Calibration Point Implementations

The hit-sensing calibration-enabled target can be configured with a calibration trace structure in a number of ways. For example one or more trace sections can be connected to the calibration point. Piercing the calibration point with a conductive object, such as a bullet, creates a connection between the single or multiple calibration traces and the common conductive layer of the target, typically the inner conductive layer. The calibration traces can be either independent circuits or in parallel with one or more zones of the target. Alternatively, the calibration traces can be configured in a way that negates the need to pierce the target to enter calibration mode, but rather by bridging two or more coplanar regions with a flat conductive object on the surface of the target. By way of example and not limitation, the example below describes use on hit-sensing calibration-enabled targets having two trace sections connecting to a calibration point.

Figure 1B:
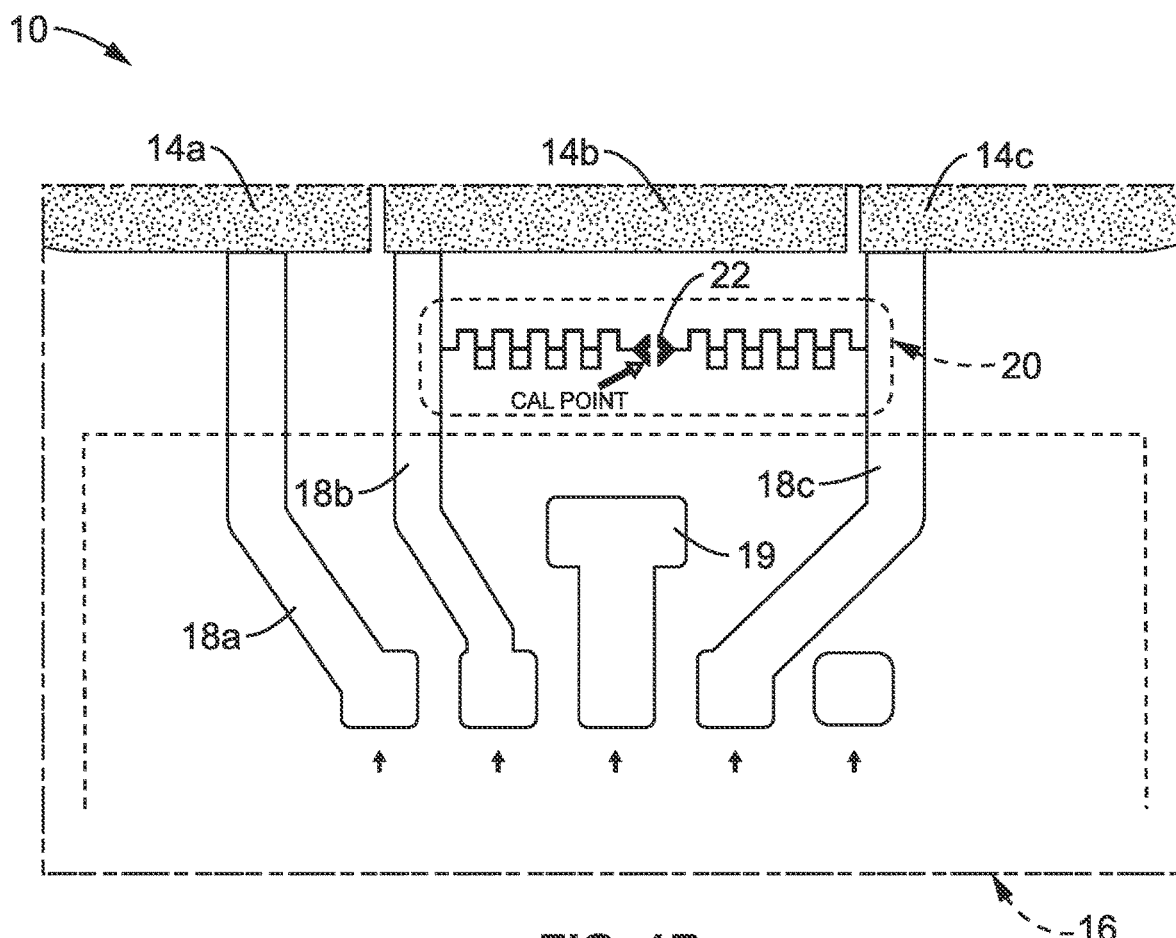

FIG. 1A and FIG. 1B illustrate an example embodiment 10 of a hit-sensing calibration-enabled target 12. A connection area portion 16 of target 12, is shown magnified in FIG. 1B to show connections through traces 18a, 18b, 18c to different regions (zones) 14a, 14b, and 14c of the target. A trace 19 is shown which connects to the back conductive layer (electrically common layer) of the target.

A calibration trace structure 20 is added to the target panel between existing connection traces 18b and 18c to a calibration point 22, and preferably associated calibration point indicia (here shown indicating "CAL POINT"), that enable the end user to adjust the calibration threshold in the electronics of the target system (e.g., a target controller unit, or target positioning unit controller).

In one implementation the calibration trace structure is configured for being manually pierced by a bullet or other electrically conductive object, thus making contact from the calibration point 22 to each of the traces 18b, 18c, creating a connection to the common layer, thereby generating a signal to the electronics. The user can then observe the signal generated by this condition and adjust signal thresholds until this signal is considered a hit by the electronics. This process can either be performed manually, as described, or automatically using an external circuit. It should be appreciated that in at least one preferred embodiment, the calibration traces can be added in-between existing trace connections so that additional connections to the target panel are not required, thus limiting the need to redesign the mechanical and electrical connection aspects of existing target controllers.

Figure 2:
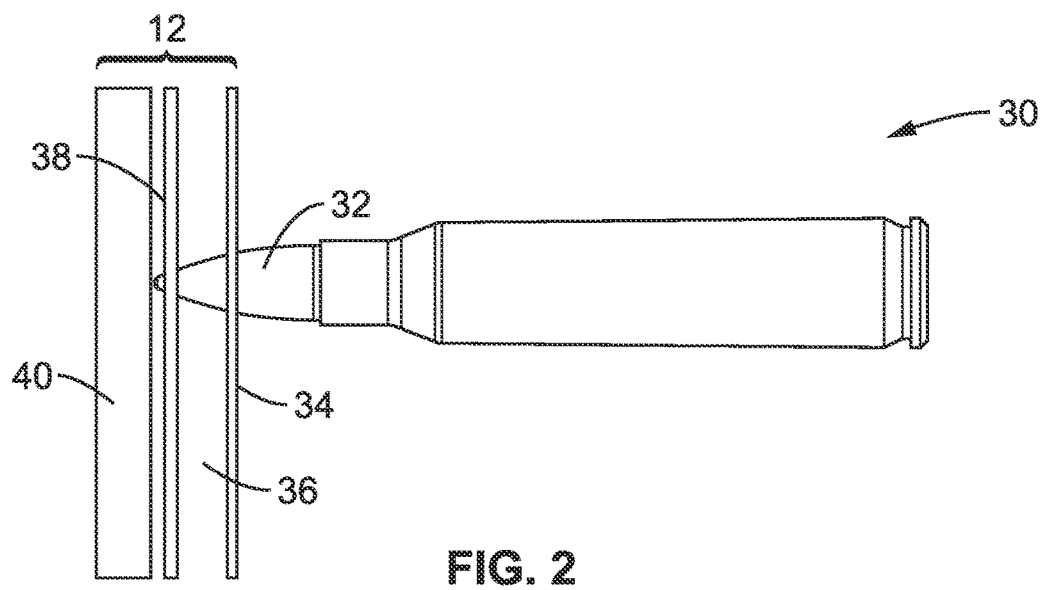
FIG. 2 is a side view of a calibration-enabled hit-sensing target panel shown being manually activated into a calibration mode by pressing the conductive bullet into a calibration point of the target panel, according to at least one embodiment of the present disclosure.

FIG. 2 illustrates an example embodiment 30 showing a conductive element 32, exemplified as a bullet with conductive exterior, shown piercing through a front layer 34 at the calibration point through a middle layer 36 to a back layer 38 which is adjacent to a structural backing 40.

Figure 3:
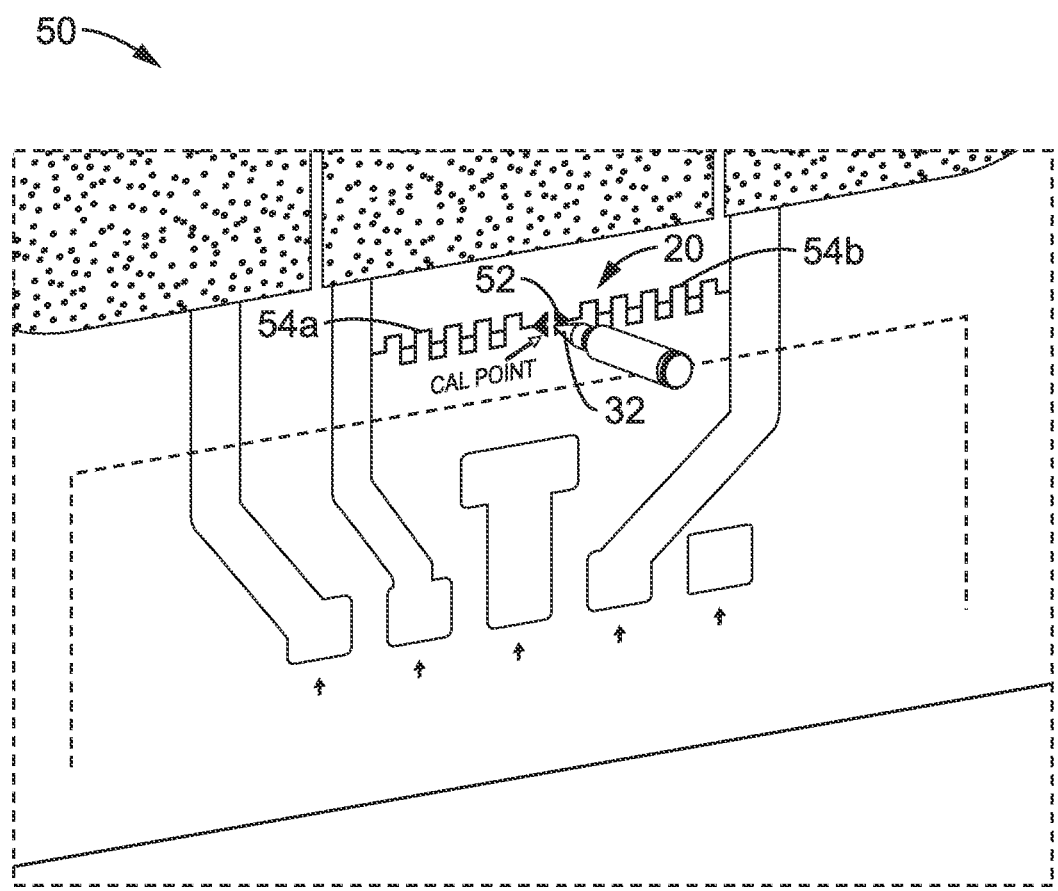
FIG. 3 and FIG. 4 are pictorial views of a calibration-enabled hit-sensing target panel shown just prior to, and as activated, into a calibration mode by pressing a conductive bullet into the target panel, according to at least one embodiment of the present disclosure.

FIG. 3 illustrates an example embodiment 50 of hit-sensing calibration-enabled target 12 with a conductive element 32 lined up for piercing at the calibration point 52 between trace 54a, 54b of calibration trace structure 20.

Figure 4:
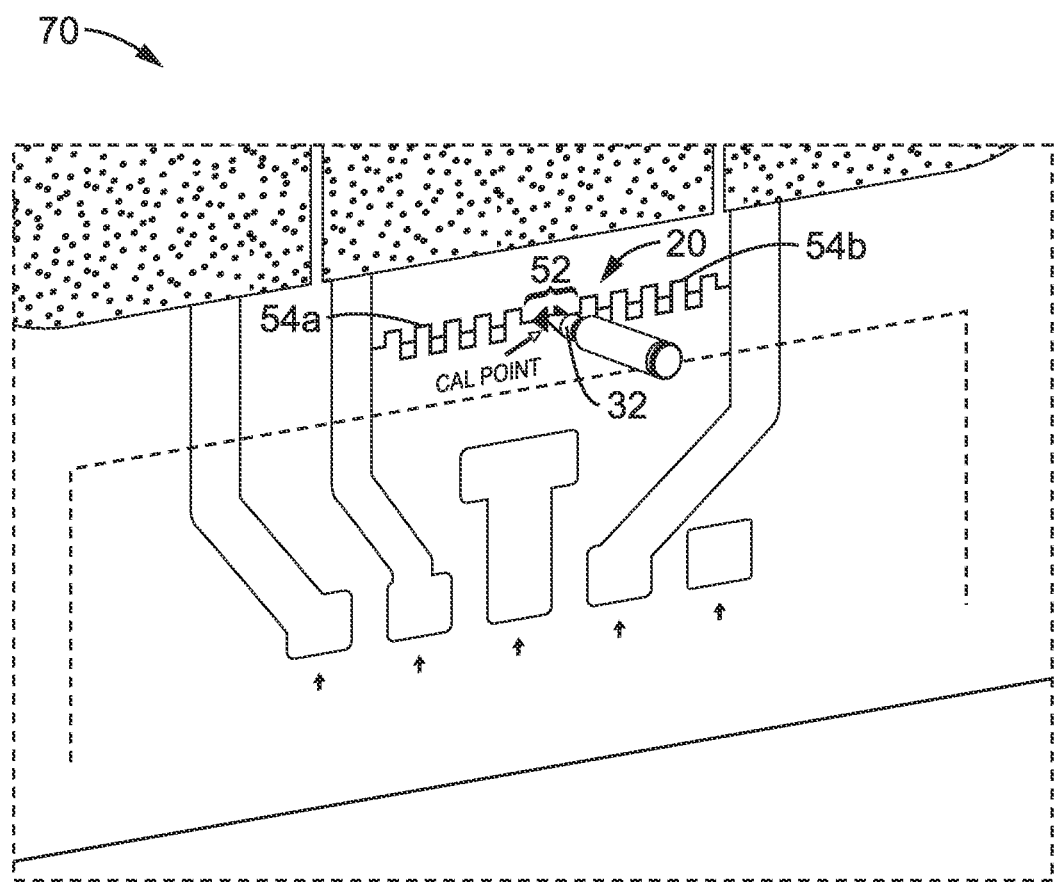

FIG. 4 illustrates an example embodiment 70 of a hit-sensing calibration-enabled target 12 with conductive element 32 piercing calibration point 52.

Figure 5:
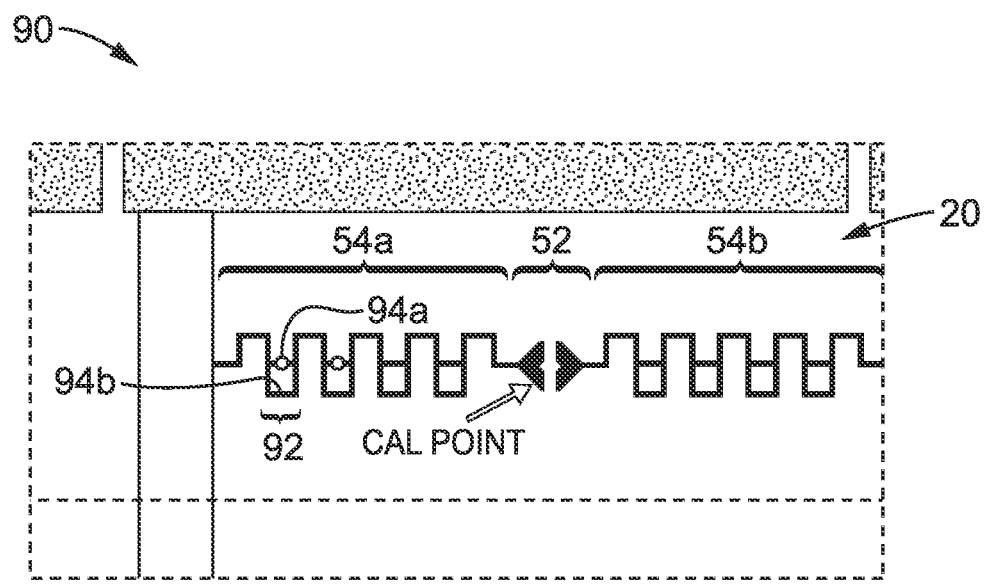
FIG. 5 is a front view of a contact area on a calibration-enabled hit-sensing target panel depicting calibration traces and pads, according to at least one embodiment of the present disclosure.

FIG. 5 illustrates an example embodiment 90 of a segmented calibration trace structure 20, exemplified as a serpentine calibration trace with sections 54a, 54b on either side of calibration point 54. In at least one embodiment, the resistances of these two trace sections 54a, 54b are deliberately different to provide a "window" within which the threshold is to be set. One trace for example having a lower resistance for determining one end of a sensing threshold, and the other trace having a higher resistance for determining the other ends of the sensing threshold. This is described in more detail in a later section.

In at least one embodiment the calibration traces contain multiple segments, exemplified herein as segments of a serpentine trace. Each segment 92 of the serpentine trace has a short path 94a and a long path 94b, so that the resistance of each calibration trace section 54a, 54b, may be adjusted to match the resistance parameters of the target panel, so that calibration can be accurately performed using the calibration point before normal target use. For example, if the ratio of the resistance of section 14b of the target to the resistance of trace section 54a is outside of the desired specification, then current path 94a may be removed, such as being cut, or punched out, to increase resistance of the path. If the resistance is still not sufficiently high, then another current path may be removed and so forth, until a sufficiently appropriate match is made with the resistance characteristics of the target panel so that the calibration point will provide accurate results. This process is also performed on the other trace section 54b in a similar manner.

It should be appreciated that when providing limits for setting the threshold, it's generally desirable for there to be a small delta between the upper and lower limits, so that a more accurate calibration can be attained. As it is difficult to achieve this level of accuracy and consistency in a conductive ink (or paint) application process, in at least one embodiment the calibration traces are designed to be modifiable after they are applied. In this case the calibration traces as manufactured intentionally undershoot the desired resistance, so that before being received by the user, the resistance can be precisely increased to more accurate thresholds by "punching out", or cutting, areas of the calibration traces.

It should be noted that in at least one embodiment, the calibration traces are in parallel with the zones, but are otherwise independent of them.

In at least one alternative embodiment, the traces can be completely separate circuits from the target zones, with the requirement of adding extra electrical connections from the target trace to a target retention device, which hold the target in position and provides the electrical connectivity from the target to the hit sensing and calibration electronics. For example, in FIG. 1B additional traces could be added on either side of common trace 19 which extend up to connect into the calibrations traces shown, instead of them connecting to existing zone traces 18b and 18c.

In at least one embodiment, the calibration traces are simply always connected, such as by modifying FIG. 5 to join the calibration pads, or eliminating the contact pads and just joining the traces together in the middle. In a first variation, additional contact points are added on the target which connect to these calibration traces. In another variation, there are simply less zones on the target than the number of contact points available, thus allowing using one or more of the remaining contact points for connecting the calibration traces.

In at least one similar embodiment, a resistive path can be added to the target for automatically detecting the target style, so that the proper graphics are displayed on the control device. In one variant these traces, or a connection to them, is removable after the target is identified (e.g., by removing a conductive tape, tab, or similar temporary interconnection). In another variant the traces can remain connected in parallel with one or more target zones, yet have a sufficiently high resistance that hit sensing operates without impacting target zone functionality.

In addition, in at least one alternative embodiment, a separate target could be provided which actually has no zones, but only the calibration traces.

5. Calibration Adjustment

Figure 6:
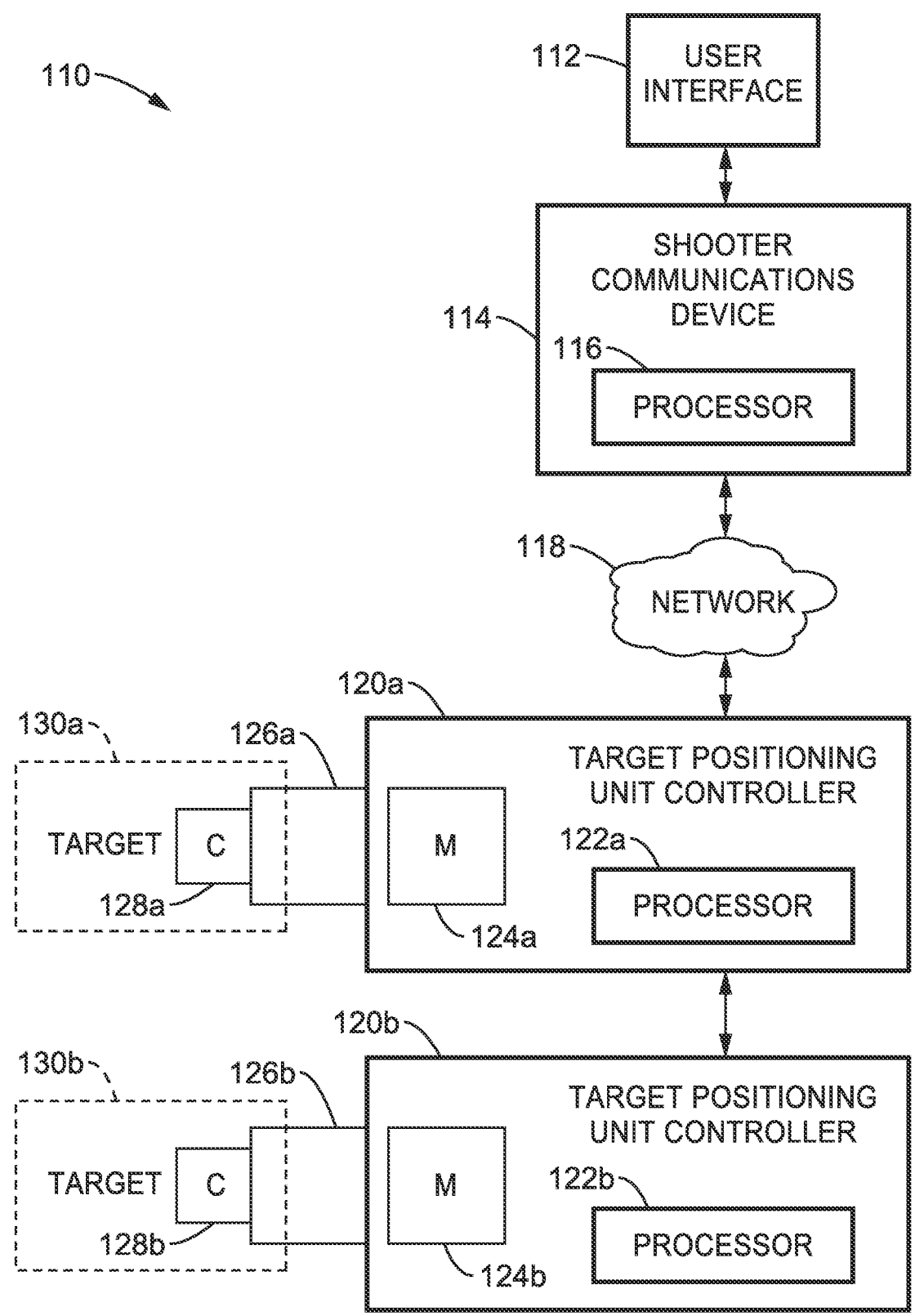
FIG. 6 is a block diagram of a target shooting system having target controllers configured for using calibration-enabled hit-sensing target panels, according to at least one embodiment of the present disclosure.

FIG. 6 illustrates an example embodiment 110 of a target system configured with at least one target controller unit, exemplified here depicting multiple target positioning unit controllers.

A shooter communications device 114 is shown having a processor 116 coupled to a user interface 112 and a network 118. The shooter communications device controls one or more target controllers which register the hits on their attached targets; and may include software, firmware, hardware, or any combination thereof. By way of example and not limitation, the target controllers shown are target positioning unit controllers 120a, 120b, which provide for changing the position of the target, as well as for registering hits from the associated targets.

A shooter or other user of the target system 110 may interact with the shooter communications device 114 through user interface 112, which may include any type of display device, and user input mechanism, and which preferably includes audio output. The shooter communications device 114 may be any device that is capable of controlling target system parameters, displaying information about the target configurations and electronically communicating with other devices.

The shooter communications device 114 communicates with the controllers 122a, 122b of the target positioning units 120a and 120b through a network 134. The network 134 may include one or more wired or wireless networks, such as the Internet, and may include one or more wide area networks (WAN) and/or local area networks (LAN).

In addition, each target positioning unit 120a, 120b can provide a "repeater" function for relaying signals between different target positioning units. For example, a first target positioning unit located within the wireless operating range of the shooter communications device may relay signals received from the shooter communications device 16 to a second target positioning unit located beyond the wireless operating range of the shooter communications device.

The figure additionally depicts connection of a hit-sensing calibration-enabled target panel 130a, 130b to each respective target positioning unit controller (TPUC) 120a, 120b. The calibration trace structure block 128a, 128b is shown on each target. It will be noted that the target is physically coupled in a retention structure 126a, 126b, which provides electrical connections from the traces of the target into a measurement unit 124a, 124b of the respective TPUC.

One of ordinary skill in the art will appreciate that there are a number of methods which can be utilized to determine if there has been a bullet impact on the target based on detecting brief changes in the electrical characteristics of the target. The measurement unit is configured for generating an electrical signal which for a brief period (based on projectile velocity, projectile length, and distance between front and back conductive layers) passes through the conductive layers of the target. The measurement unit 124a and 124b determines whether the signal received is sufficient to register a hit.

The sensing circuit may operate using voltage, current and/or impedance/resistance sensing in its measurements. In one simple mechanism the common conductive layer is set at a fixed low voltage value (e.g., approximately 3-30V) with the connection being sensed between the conductive layers of the target in response to voltage or current being sensed (measured) on the zone layer.

In the present disclosure, the measurement unit is also configured for operating with a target having a calibration trace structure. The measurement unit contains a sense threshold that can be adjusted, either for the target zone regions as a whole or adjusted separately for each front region (each target zone). It should be appreciated that this threshold adjustment may be either a manual (e.g., turning a potentiometer) or an automatic adjustment (e.g., through software and supporting circuitry).

In at least one embodiment, this threshold adjustment is performed by setting the threshold of a comparator circuit, such as by: (a) manually adjusting a potentiometer coupled to a voltage reference, or (b) automatic adjustment, for example by remotely adjusting a digital-to-analog converter, which provides a reference voltage to the comparator circuit. In each case the comparator(s) require sufficient speed for registering the very brief duration of the bullet hit.

The general process for performing calibration is to first determine that the target is not faulty (e.g., shorted) prior to entering a calibration phase. The calibration phase can be entered wherein a user/operator is at the target and has pressed a conductive object into the calibration point.

The threshold setting(s) are then adjusted based on measurements of the resistance of the calibration trace(s) to prevent missed hits, while preventing unwanted triggers from external electrical noise sources. The manner of this process depends on the specific configuration of the thresholding circuit. Once a proper balance is achieved (between sensitivity being too low or too high), then the conductive object can be removed and the calibration phase is completed.

The following describes at least one embodiment of a TPUC having a single calibration adjustment for the comparators, and using the calibration point as depicted in FIG. 1A through FIG. 5. As a conductor, (e.g., "calibration bullet") is pressed through the calibration point there are actually two different signals being generated which are deliberately different from each other providing essentially a "window" with both high and low thresholds. If the threshold is set too high, then no hit is registered in any of the zones. If the threshold is set too low then a hit is registered in more than one zone. A correctly set threshold is between the low and high thresholds with a hit being registered in a single zone.

It should also be appreciated that the electronics may be configured so that each zone of the target has its own thresholding adjustment (e.g., manual or automatic) so that different zones can each have their own calibration thresholds.

6. Two Calibration Point Implementation

In at least one embodiment the calibration trace structure can be configured with multiple calibration points, the following exemplifying two different calibration points.

Figure 7:
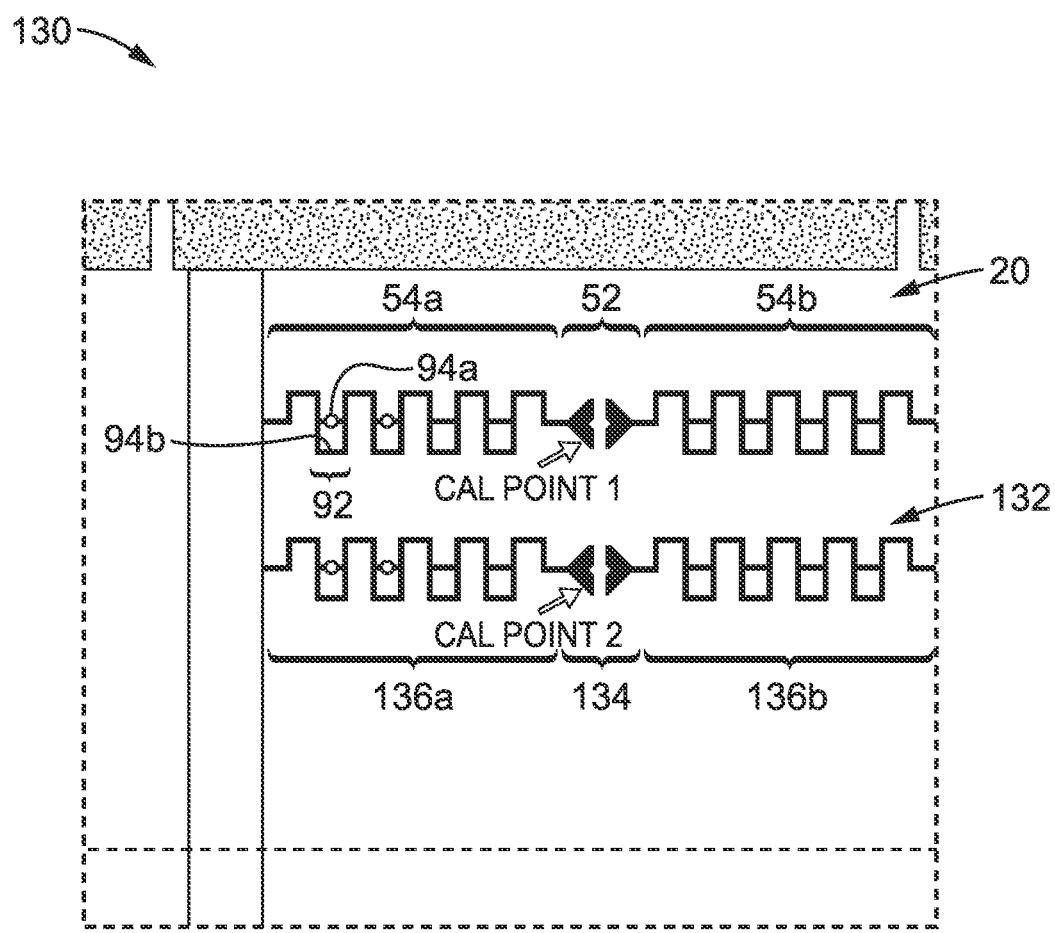
FIG. 7 is a front view of a contact area on a calibration-enabled hit-sensing target panel depicting multiple calibration traces and pads, according to at least one embodiment of the present disclosure.

FIG. 7 illustrates an example embodiment 130 having two calibration points with associated traces. In this embodiment, the calibration traces of FIG. 5 are shown, as well as a second calibration trace structure 132 having electrical traces 136a and 136b connecting to a second calibration point 134. The second set of traces to the second calibration point are configured to have a different level of resistance, such as the traces being longer and/or thinner than the first set of traces.

In this embodiment, calibration can be performed using the first set of traces to establish the threshold for one or more (but not all) target zones, and using the second set of traces to establish a different threshold for the remainder of the target zones. If more than two different thresholds are needed, additional sets of calibration traces can be added without limitation.

After the adjustment is made, the user can remove the bullet and proceed to use the target to register hits for actual gunfire.

7. No Pierce Point Implementation

In at least one embodiment the target can be produced so that there is no need to pierce through the layers of the target to make the calibration connection.

It will be appreciated that conductive traces 54a, 54b, such as in FIG. 3, can be bridged by a blunt conductive element. If one of these conductive traces is connected to the common layer instead of to one of the zone layers, then calibration could be performed.

In a more preferable implementation another common trace can be extended from the common trace connection 19 in FIG. 1B to another contact pad, which is positioned proximal to contact pads for any of the calibration traces that are connected to the hit zone traces. Thus, pressing a blunt conductive element, or conductive tape or strip, over these pads can establish connection, without the need of piercing the target, such with a bullet, through both the zone and common layers.

8. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A bullet hit detecting target panel apparatus, comprising: (a) at least a first and second layer containing electrically conductive regions and/or traces on a target panel; (b) said first layer of electrically conductive regions and/or traces comprising at least one conductive region for at least one target zone; (c) said second layer of electrically conductive regions and/or traces comprising at least one conductive region, providing a common connection for one or more target zones; (d) wherein said target panel is configured so that a bullet entering a target zone and passing through the target panel between said at least first and second layers creates a brief connection between the electrically conductive regions of the target as the bullet passes through the layers of the target panel; and (e) at least one calibration trace structure on said target panel comprising at least one conductive calibration trace, configured with a selected amount of electrical resistance which is configured for being measured during a calibration process of an external circuit for establishing one or more hit sensing thresholds for the target panel apparatus.

A hit detecting target panel apparatus, comprising: (a) at least a first and second layer containing electrically conductive regions and/or traces on a target panel; (b) at least one connection region of said target panel configured for establishing electrical connection with said at least first and second layers of said target panel; (c) said first and second layer of electrically conductive regions and/or traces are separated from one another by at least one non-conductive layer; (d) said first layer of electrically conductive regions and/or traces comprising separate conductive regions for each target zone which are connected to target zone traces that extend into said at least one connection region of the target panel; (e) said second layer of electrically conductive regions and/or traces comprising at least one conductive region, providing a common connection for one or more target zones, which is connected to at least one common trace that extends into said at least one connection region of said target panel; (f) wherein said target panel is configured so that a bullet entering a target zone and passing through between said at least first and second layers creates a temporary connection between the conductive layers of the target; (g) at least one calibration trace structure on said target panel comprising at least one conductive calibration trace, configured with a selected amount of electrical resistance, said conductive calibration trace extending from at least one target zone trace to a conductive calibration point pad positioned proximal to, but electrically separated from a common connection for at least one associated target zone; and (h) wherein applying a conductive element to electrically connect between a conductive calibration point pad for at least one conductive calibration trace and an associated common connection establishes an electrical path from said target zone trace through said at least one said conductive calibration trace to said common connection to allow adjusting a hit sensing threshold of any attached targeting system electronics to avoid missing bullet hits or incorrectly registering changing environmental factors as bullet hits.

A target controller apparatus, comprising: (a) a housing of the target controller configured for physically retaining a target panel and for establishing electrical connection to different electrically conductive regions and/or traces on different layers of the target panel; (b) a measurement unit of said target controller configured for registering bullet hits on the target panel, comprising: (b)(i) setting a sensing threshold for detecting bullet hits in response to registering electrical resistance of at least one conductive calibration trace on said target panel when said target panel is put into a calibration mode; (b)(ii) detecting a bullet hit when a bullet passes through the target panel and temporarily connects between the different electrically conductive regions and/or traces on different layers of said target panel to generate a signal which exceeds the sensing threshold; and (b)(iii) whereby target calibration increases the accuracy of detecting bullet hits on hit sensing targets which may utilize non-foil type conductive coatings on one or more layers.

A method of detecting bullet hits on a target panel, comprising the steps: (a) applying a conductor to one or more resistive calibration structures on the target panel to enter a calibration mode for the target panel; (b) measuring the electrical characteristics in calibration mode for said one or more resistive structures of the target panel; (c) setting a hit threshold for target zones on the target panel in response to said electrical characteristics; and (d) removing the conductor from one or more resistive calibration structures on the target panel to enter a bullet hit detection mode in which any bullet passing through layers of a target zone in said target panel connects between conductive layers and is registered as a hit if the signal exceeds the hit threshold set during calibration. 2. The apparatus of claim 1, wherein applying a conductive element to electrically connect between a conductive calibration point pad for at least one conductive calibration trace and an associated common connection establishes an electrical path from said target zone trace through said at least one said conductive calibration trace to said common connection.

A bullet detecting target panel, comprising: (a) a first electrically conductive layer; (b) a second electrically conductive layer; (c) an electrically insulating layer between the first and second electrically conductive layers; and (d) a conductive region of material on said first electrically conductive layer configured to create a current path with a given electrical resistance; (e) wherein said electrical resistance can be measured with an external circuit.

A bullet detecting target panel, comprising: (a) a first electrically conductive layer; (b) a second electrically conductive layer; (c) an electrically insulating layer between the first and second electrically conductive layers; and (d) a plurality of conductive regions of material on the first electrically conductive layer, each conductive region of material configured to create a current path with a given electrical resistance; (e) wherein said electrical resistance can be measured with an external circuit.

The apparatus or method of any preceding implementation, wherein said target panel is configured to allow measuring the electrical characteristics of at least one conductive calibration trace by an external circuit so that calibration can be performed to avoid missing bullet hits or incorrectly interpreting electrical noise or moisture as bullet hits.

The apparatus or method of any preceding implementation, wherein at least one layer of said bullet hit detecting target panel apparatus comprises a non-foil type conductive coating.

The apparatus or method of any preceding implementation, wherein the conductive region of material includes a contact pad; and wherein the conductive region of material is electrically connected to the second electrically conductive layer when the contact pad is pierced to a sufficient depth by an electrically conductive object.

The apparatus or method of any preceding implementation, wherein the conductive region of material comprises a contact pad in close proximity to a second contact pad; and wherein the contact pads are configured to allow a flat or blunt electrically conductive object to be pressed against the contact pads, thereby electrically bridging the contact pads and creating a current path between the conductive region of material and the second contact pad.

The apparatus or method of any preceding implementation, wherein said conductive region of material comprises a plurality of current paths in parallel; and wherein one or more current paths is configured for being removed for adjusting resistance of the conductive path to match resistance parameters of said target panel apparatus.

The apparatus or method of any preceding implementation, wherein at least one layer of said bullet hit detecting target panel apparatus comprises a non-foil type conductive coating.

The apparatus or method of any preceding implementation, wherein said target panel is configured for performing calibration by applying a conductive element which pierces the target to establish electrical connection between said conductive calibration point pad of at least one calibration trace on one said layer of said target panel and a common region and/or trace on another layer of said target panel.

The apparatus or method of any preceding implementation, where said calibration trace structure is configured so that a bullet may be manually pressed into the conductive calibration point pad as said conductive element.

The apparatus or method of any preceding implementation, wherein said target panel is configured for performing calibration by applying a conductive element over said conductive calibration point pad of at least one calibration trace, and a calibration point pad from a common connection for at least one associated target zone.

The apparatus or method of any preceding implementation, wherein said at least one conductive calibration trace is configured with multiple segments, which may be cut or otherwise removed, to adjust the resistance of each conductive calibration trace to match the resistance parameters of the specific target panel to assure that when the target panel is coupled to electronics of a targeting system the hit threshold can be properly calibrated.

The apparatus or method of any preceding implementation, wherein said at least one connection region of said target panel is located in an area of the target panel that is not subject to bullet hits when said target panel is properly mounted for use.

The apparatus or method of any preceding implementation, wherein said calibration trace structure is located in the connection region of said target panel.

The apparatus or method of any preceding implementation, wherein said calibration trace structure of said target panel comprises at least two conductive calibration traces having different resistances which are configured to allow adjusting the hit sensing threshold of targeting system electronics into a proper range between being too high with the calibration connection not registering as a hit for either of the zones, and too low in which the calibration connection causes registering as a hit in multiple zones of the target panel.

The apparatus or method of any preceding implementation, wherein at least one layer of said bullet hit detecting target panel apparatus comprises a non-foil type conductive coating.

The apparatus or method of any preceding implementation, whereby said method increases the accuracy of bullet hit detection on target panels utilizing non-foil type conductive coatings on one or more of the conductive target layers.

The apparatus or method of any preceding implementation, wherein the conductive region of material includes a contact pad; and wherein the conductive region of material is electrically connected to the second electrically conductive layer when the contact pad is pierced by an electrically conductive object.

The apparatus or method of any preceding implementation, wherein the conductive region of material includes a contact pad in close proximity to a second contact pad; and wherein the contact pads are configured to allow a flat or blunt electrically conductive object to be pressed against the contact pads, thereby electrically bridging the contact pads and creating a current path between the conductive region of material and the second contact pad.

The apparatus or method of any preceding implementation, wherein said conductive region of material comprises a plurality of current paths in parallel; and wherein one or more current paths may be removed to adjust resistance of the conductive region of material.

The apparatus or method of any preceding implementation, wherein each conductive region of material includes a contact pad; and wherein said contact pads are configured to allow a single bullet or other sharp conductive object to pierce the first electrically conductive layer and simultaneously connect the plurality of conductive regions to the second electrically conductive layer.

The apparatus or method of any preceding implementation, wherein each conductive region of material includes a contact pad; and wherein the contact pads are configured to allow a flat or blunt electrically conductive object to be pressed against the contact pads, thereby electrically bridging the conductive regions of material.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A hit detecting target panel apparatus, comprising:
   (a) at least a first and second layer containing electrically conductive regions and/or traces on a target panel;
   (b) at least one connection region of said target panel configured for establishing electrical connection with said at least first and second layers of said target panel;
   (c) said first and second layer of electrically conductive regions and/or traces are separated from one another by at least one non-conductive layer;
   (d) said first layer of electrically conductive regions and/or traces comprising separate conductive regions for each target zone which are connected to target zone traces that extend into said at least one connection region of the target panel;
   (e) said second layer of electrically conductive regions and/or traces comprising at least one conductive region, providing a common connection for one or more target zones, which is connected to at least one common trace that extends into said at least one connection region of said target panel;
   (f) wherein said target panel is configured so that a bullet entering a target zone and passing through between said at least first and second layers creates a temporary connection between the conductive layers of the target;
   (g) at least one calibration trace structure on said target panel comprising at least one conductive calibration trace, configured with a selected amount of electrical resistance, said conductive calibration trace extending from at least one target zone trace to a conductive calibration point pad positioned proximal to, but electrically separated from a common connection for at least one associated target zone;
   (h) wherein applying a conductive element to electrically connect between a conductive calibration point pad for at least one conductive calibration trace and an associated common connection establishes an electrical path from said target zone trace through said at least one said conductive calibration trace to said common connection to allow adjusting a hit sensing threshold of any attached targeting system electronics to avoid missing bullet hits or incorrectly registering changing environmental factors as bullet hits; and
   wherein said target panel is configured for performing calibration by applying a conductive element over said conductive calibration point pad of at least one calibration trace, and a calibration point pad from a common connection for at least one associated target zone.

2. The apparatus of claim 1, wherein said target panel is configured for performing calibration by applying a conductive element which pierces the target to establish electrical connection between said conductive calibration point pad of at least one calibration trace on one said layer of said target panel and a common region and/or trace on another layer of said target panel.

3. The apparatus of claim 2, where said calibration trace structure is configured so that a bullet may be manually pressed into the conductive calibration point pad as said conductive element.

4. The apparatus of claim 1, wherein said at least one connection region of said target panel is located in an area of the target panel that is not subject to bullet hits when said target panel is properly mounted for use.

5. The apparatus of claim 1, wherein said calibration trace structure is located in the connection region of said target panel.

6. The apparatus of claim 1, wherein at least one layer of said bullet hit detecting target panel apparatus comprises a non-foil type conductive coating.

7. A hit detecting target panel apparatus, comprising:
  (a) at least a first and second layer containing electrically conductive regions and/or traces on a target panel;
  (b) at least one connection region of said target panel configured for establishing electrical connection with said at least first and second layers of said target panel;
  (c) said first and second layer of electrically conductive regions and/or traces are separated from one another by at least one non-conductive layer;
  (d) said first layer of electrically conductive regions and/or traces comprising separate conductive regions for each target zone which are connected to target zone traces that extend into said at least one connection region of the target panel;
  (e) said second layer of electrically conductive regions and/or traces comprising at least one conductive region, providing a common connection for one or more target zones, which is connected to at least one common trace that extends into said at least one connection region of said target panel;
  (f) wherein said target panel is configured so that a bullet entering a target zone and passing through between said at least first and second layers creates a temporary connection between the conductive layers of the target;
  (g) at least one calibration trace structure on said target panel comprising at least one conductive calibration trace, configured with a selected amount of electrical resistance, said conductive calibration trace extending from at least one target zone trace to a conductive calibration point pad positioned proximal to, but electrically separated from a common connection for at least one associated target zone;
  (h) wherein applying a conductive element to electrically connect between a conductive calibration point pad for at least one conductive calibration trace and an associated common connection establishes an electrical path from said target zone trace through said at least one said conductive calibration trace to said common connection to allow adjusting a hit sensing threshold of any attached targeting system electronics to avoid missing bullet hits or incorrectly registering changing environmental factors as bullet hits; and
  (i) wherein said at least one conductive calibration trace is configured with multiple segments, which may be cut or otherwise removed, to adjust the resistance of each conductive calibration trace to match the resistance parameters of the specific target panel to assure that when the target panel is coupled to electronics of a targeting system the hit threshold can be properly calibrated.

8. The apparatus of claim 7, wherein said target panel is configured for performing calibration by applying a conductive element which pierces the target to establish electrical connection between said conductive calibration point pad of at least one calibration trace on one said layer of said target panel and a common region and/or trace on another layer of said target panel.

9. The apparatus of claim 8, where said calibration trace structure is configured so that a bullet may be manually pressed into the conductive calibration point pad as said conductive element.

10. The apparatus of claim 7, wherein said at least one connection region of said target panel is located in an area of the target panel that is not subject to bullet hits when said target panel is properly mounted for use.

11. The apparatus of claim 7, wherein said calibration trace structure is located in the connection region of said target panel.

12. The apparatus of claim 7, wherein at least one layer of said bullet hit detecting target panel apparatus comprises a non-foil type conductive coating.

13. A hit detecting target panel apparatus, comprising:
  (a) at least a first and second layer containing electrically conductive regions and/or traces on a target panel;
  (b) at least one connection region of said target panel configured for establishing electrical connection with said at least first and second layers of said target panel;
  (c) said first and second layer of electrically conductive regions and/or traces are separated from one another by at least one non-conductive layer;
  (d) said first layer of electrically conductive regions and/or traces comprising separate conductive regions for each target zone which are connected to target zone traces that extend into said at least one connection region of the target panel;
  (e) said second layer of electrically conductive regions and/or traces comprising at least one conductive region, providing a common connection for one or more target zones, which is connected to at least one common trace that extends into said at least one connection region of said target panel;
  (f) wherein said target panel is configured so that a bullet entering a target zone and passing through between said at least first and second layers creates a temporary connection between the conductive layers of the target;
  (g) at least one calibration trace structure on said target panel comprising at least one conductive calibration trace, configured with a selected amount of electrical resistance, said conductive calibration trace extending from at least one target zone trace to a conductive calibration point pad positioned proximal to, but electrically separated from a common connection for at least one associated target zone;
  (h) wherein applying a conductive element to electrically connect between a conductive calibration point pad for at least one conductive calibration trace and an associated common connection establishes an electrical path from said target zone trace through said at least one said conductive calibration trace to said common connection to allow adjusting a hit sensing threshold of any attached targeting system electronics to avoid missing bullet hits or incorrectly registering changing environmental factors as bullet hits; and
  (i) wherein said calibration trace structure of said target panel comprises at least two conductive calibration traces having different resistances which are configured to allow adjusting the hit sensing threshold of targeting system electronics into a proper range between being too high with the calibration connection not registering as a hit for either of the zones, and too low in which the calibration connection causes registering as a hit in multiple zones of the target panel.

14. The apparatus of claim 13, wherein said target panel is configured for performing calibration by applying a conductive element which pierces the target to establish electrical connection between said conductive calibration point pad of at least one calibration trace on one said layer of said target panel and a common region and/or trace on another layer of said target panel.

15. The apparatus of claim 14, where said calibration trace structure is configured so that a bullet may be manually pressed into the conductive calibration point pad as said conductive element.

16. The apparatus of claim 13, wherein said at least one connection region of said target panel is located in an area of the target panel that is not subject to bullet hits when said target panel is properly mounted for use.

17. The apparatus of claim 13, wherein said calibration trace structure is located in the connection region of said target panel.

18. The apparatus of claim 13, wherein at least one layer of said bullet hit detecting target panel apparatus comprises a non-foil type conductive coating.

* * * * *